United States Patent [19]
Gatti

[11] Patent Number: 6,137,190
[45] Date of Patent: Oct. 24, 2000

[54] METHOD AND SYSTEM FOR PROVIDING COORDINATED TURN ON OF PARALLELED POWER SUPPLIES

[75] Inventor: John E. Gatti, Scottsdale, Ariz.

[73] Assignee: Motorola, Inc., Schaumburg, Ill.

[21] Appl. No.: 09/405,717

[22] Filed: Sep. 24, 1999

[51] Int. Cl.$^7$ ....................................................... H02J 1/00
[52] U.S. Cl. ............................................... 307/80; 307/81
[58] Field of Search ................................. 307/55, 64, 65, 307/66, 80, 81, 85, 86, 87

[56] References Cited

U.S. PATENT DOCUMENTS

| | | | |
|---|---|---|---|
| 4,074,146 | 2/1978 | Buonavita | 307/60 |
| 4,356,403 | 10/1982 | Mohat | 307/60 |
| 5,834,925 | 11/1998 | Chesavage | 323/272 |

*Primary Examiner*—Stephen W. Jackson
*Assistant Examiner*—Robert L. Deberadins
*Attorney, Agent, or Firm*—S. Kevin Pickens

[57] ABSTRACT

A power supply includes a turn on circuit which coordinates turn on of all paralleled power supplies supplying power to an electronic system such as a computer system. Upon detecting that its input voltage is sufficient to turn on, the power supply waits for a delay period long enough to ensure readiness of any of the paralleled power supplies and then determines that it can start independently. Upon detecting bus voltage sufficient to ensure that another power supply has turned on, the power supply determines that another power supply has turned on. If either condition is determined, the power supply turns on and begins supplying power to the computer system. As a result, the first power supply to turn on will be detected by the other power supplies, and the other power supplies will turn on immediately thereafter.

20 Claims, 1 Drawing Sheet

METHOD AND SYSTEM FOR PROVIDING COORDINATED TURN ON OF PARALLELED POWER SUPPLIES

FIELD OF THE INVENTION

The present invention relates generally to electronic systems and, more specifically, to paralleled power supplies.

BACKGROUND OF THE INVENTION

An electronic system such as a computer system may take advantage of multiple power supplies which share the load supplying power to the computer system. In a system which uses such paralleled power supplies, it is important to coordinate turn on of all the power supplies when starting up the system. For example, if one power supply turns on before the others, that power supply may detect an overload and shut down before the other power supplies turn on to assist with the load, which can result in system failure. Additionally, coordinating turn on of the power supplies allows the system voltages to ramp to required values monotonically, which is required by some electronic loads.

A typical solution to this problem is the use of an interconnecting signal between the power supplies which does not allow any of the power supplies to turn on until all have indicated readiness to turn on. This solution has disadvantages, however. For example, a single bad power supply will keep the entire computer system from powering on. This result is not always warranted, such as with an n+1 system where an additional power supply is already provided to ensure fault tolerance. Shutting down an n+1 system due to a single bad power supply would defeat the advantage of fault tolerance. Further, providing a separate signal between power supplies is expensive. Thus, a different means of coordinating turn on of paralleled power supplies is desirable.

DESCRIPTION OF THE PREFERRED EMBODIMENT

The preferred embodiment of the invention provides coordinated turn on of paralleled power supplies to an electronic system such as a computer system by detecting the voltage impressed on the system voltage bus by the first power supply to turn on, and initiating turn on of the other power supplies immediately thereafter. Each power supply turns on when either it is ready to turn on or it detects that another power supply has turned on. The operation of each power supply, which will be described in detail herein, is summarized as follows. Upon detecting that its input voltage is sufficient to turn on, the power supply waits for a delay period long enough to ensure readiness of all of the paralleled power supplies and then determines that it can start independently. Upon detecting bus voltage sufficient to ensure that another power supply has turned on, the power supply determines that another power supply has turned on. If either condition is determined, the power supply turns on and begins supplying power to the computer system. As a result, the first power supply to turn on will be detected by the other power supplies, and the other power supplies will turn on immediately thereafter. This provides the advantage of coordinated turn on without the disadvantage of an unwarranted system failure in the event of a bad power supply.

Figure 1:
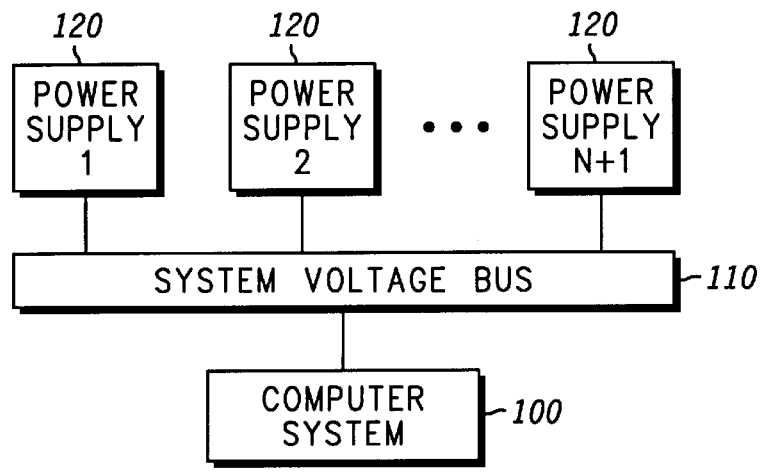
FIG. 1 is a higher level diagram of a system in which the preferred embodiment of the invention is implemented.

FIG. 1 is a higher level diagram of a system in which the preferred embodiment of the invention is implemented. A computer system 100 is connected to a system voltage bus 110. Paralleled power supplies 120 share the load to supply power to the computer system 100 via the system voltage bus 110. In the preferred embodiment, the system is an n+1 system in which an additional power supply 120 is provided. That is, n+1 power supplies 120 are provided where n power supplies 120 are sufficient to power the computer system 100. As a result, if a power supply 120 is bad, there will still be sufficient power to power the computer system.

Figure 2:
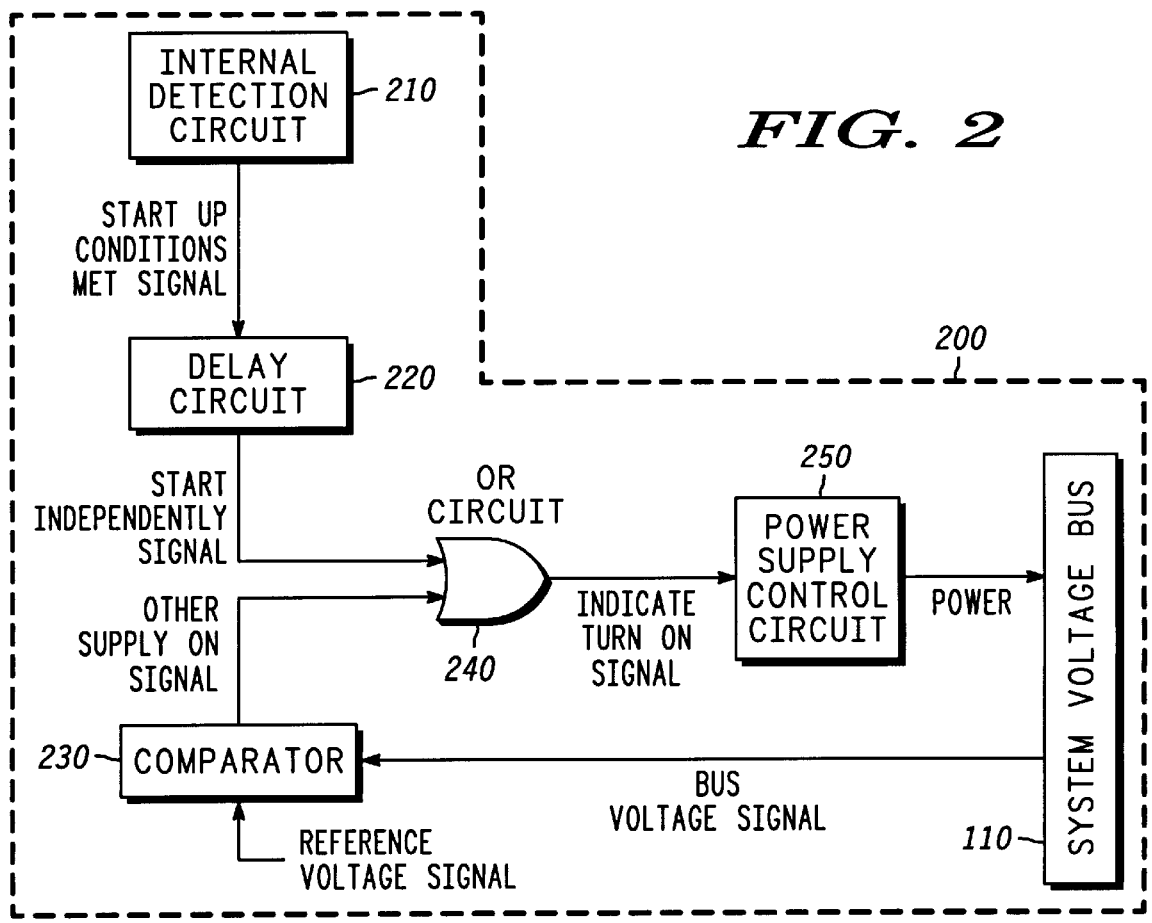
FIG. 2 is a schematic diagram of the turn on circuit in each power supply in which the preferred embodiment of the invention is implemented.

FIG. 2 is a schematic diagram of the turn on circuit 200 in each power supply 120 which implements the preferred embodiment of the invention. The turn on circuit 200 provides coordinated turn on of all of the power supplies 120. An internal detection circuit 210 first detects whether an input voltage is sufficient to turn on. This may be done by detecting an input voltage directly, or by detecting another indication of input such as bias power, or housekeeping power. The internal detection circuit 210 is, for example, a conventional detection circuit typically found in power supplies which determines sufficient input voltage and other necessary preconditions before turning on the power supply. The internal detection circuit 210 is implemented so as to provide a startup conditions met signal indicating whether the input voltage is sufficient to turn on the power supply 120. For example, the startup conditions met signal is initially deasserted and becomes asserted when the input voltage is sufficient to turn on the power supply. Alternatively, the internal detection circuit 210 could detect and/or indicate readiness to turn on by other means as appropriate to the conditions at hand.

A delay circuit 220 receives the startup conditions met signal from the internal detection circuit 210 and, when the startup conditions met signal indicates the input voltage is sufficient, waits for a delay period before providing a start independently signal indicating that the power supply 120 can start independently. For example, the start independently signal is initially deasserted and becomes asserted after receiving the startup conditions met signal and waiting for the delay period. The delay period represents the longest time period required by any power supply 120 in the system to ensure that power supply is ready to turn on. Different power supplies, even if independently designed, may take different amounts of time before becoming ready to supply power to the computer system. The time period represents the longest time of these different amounts and thus represents the minimum delay necessary to ensure all of the power supplies in the system will be ready to run by the time the delay circuit 220 provides the start independently signal.

A fundamental element of the turn on circuit 200 is that each power supply 120 has the capability of detecting a voltage on the system voltage bus and supplying power to the computer system upon determining that the bus voltage detected indicates that another power supply has turned on. A comparator 230 receives a bus voltage signal from the system voltage bus 110 which indicates the voltage on the system bus. The comparator 230 compares the magnitude of the bus voltage signal to that of a reference voltage signal, and provides, when the magnitude of the bus voltage signal exceeds the magnitude of the reference voltage signal, an other supply on signal indicating another power supply 120 has turned on. The other supply on signal is, for example, initially deasserted and becomes asserted when the bus voltage signal exceeds the reference voltage signal. When a power supply 120 turns on, it will impress a voltage on the system voltage bus 110 which can be detected by other power supplies via the bus voltage signal. The reference voltage signal represents a threshold voltage sufficient to ensure that another power supply 120 has turned on. Thus, when the bus voltage signal exceeds the reference voltage signal, the comparator 230 sets the other supply on signal to indicate that another power supply 120 has turned on. The comparator can be implemented by any logic which compares the bus voltage to a threshold voltage or, alternatively, which determines by any other means that the magnitude of the bus voltage is sufficient to indicate that another power supply has turned on.

An OR circuit 240 receives the start independently signal from the delay circuit 220 and receives the other supply on signal from the comparator 230. The OR circuit 240 can be implemented by any logic which performs or includes an OR function with respect to the start independently signal and the other supply on signal. These signals may be combined, for example, with other conditions that must be satisfied before the power supply 120 turns on. For example, a system power control switch signal can be logically combined by an AND function with the start independently signal. When either the start independently signal indicates the power supply 120 can start independently or the other supply on signal indicates another power supply 120 has turned on, the OR circuit 240 provides an initiate turn on signal indicating the power supply 120 can turn on. The initiate turn on signal is, for example, initially deasserted and becomes asserted when either condition is satisfied. A power supply control circuit 250 receives the initiate turn on signal from the OR circuit 240 and causes the power supply to supply power to the computer system 100 via the system voltage bus 110 when the initiate turn on signal indicates the power supply 120 can turn on. Thus, the power supply 120 will turn on either when it is ready to turn on and has delayed a sufficient time period to ensure all other power supplies 120 should be ready to be turned on, or when it detects that another power supply 120 has turned on.

Providing the turn on circuit 200 in each of the power supplies 120 coordinates the turn on of all the power supplies 120. When the first power supply 120 becomes ready to turn on, the turn on circuit 200 in that power supply waits or continues to wait for the delay period and then turns on. The turn on circuit 200 in each of the other power supplies 120 detects the voltage impressed on the system voltage bus 110 by the first power supply and turns on immediately thereafter. When the first power supply 120 turns on, the load is light due to low voltage prior to start up of the computer system 100 and the first power supply 120 is not subjected to an overload before the other power supplies 120 turn on immediately thereafter. It is also possible that the turn on circuits 200 in one or more other power supplies may detect the readiness of those power supplies to turn on before detecting that the first power supply 120 has turned on. This does not cause a problem, however. Those other power supplies simply start as a result of the start independently signal rather than the other supply on signal. Either way, the turn on of all power supplies 120 in the system is coordinated and the computer system 100 is started up without failure. It is thus unnecessary to implement a signal between power supplies which prevents any of them from turning on unless all indicate readiness to turn on. As a result, the voltage supplied to the system will rise monotonically. Also, a single bad power supply will not prevent the system from starting.

It should now be appreciated that the invention described herein provides the advantage of coordinated turn on of paralleled power supplies to an electronic system such as a computer system. The present invention has been described above with reference to a preferred embodiment. However, those skilled in the art will recognize that changes and modifications may be made in these preferred embodiments without departing from the scope of the present invention. For example, those aspects of the invention which perform logical functions may be implemented in hardware, firmware, software or a combination thereof.

What is claimed is:

1. A system for providing coordinated turn on of paralleled power supplies supplying power via a system voltage bus, comprising:

a computer system; and a plurality of power supplies, each power supply comprising an internal detection circuit detecting whether an input voltage is sufficient to turn on and providing a startup conditions met signal indicating whether the input voltage is sufficient to turn on the power supply, a delay circuit receiving the startup conditions met signal from the internal detection circuit and, when the startup conditions met signal indicates the input voltage is sufficient, waiting for a delay period and then providing a start independently signal indicating that the power supply can start independently, a comparator receiving a bus voltage signal from the system voltage bus, comparing the bus voltage signal to a reference voltage signal, and providing, when the bus voltage signal exceeds the reference voltage signal, an other supply on signal indicating another power supply has turned on, an OR circuit receiving the start independently signal from the delay circuit, receiving the other supply on signal from the comparator, and providing, when either the start independently signal indicates the power supply can start independently or the other supply on signal indicates another power supply has turned on, an initiate turn on signal indicating the power supply can turn on, and a power supply control circuit receiving the initiate turn on signal from the OR circuit and causing the power supply to supply power to the computer system when the initiate turn on signal indicates the power supply can turn on.

2. The system of claim 1 wherein the delay circuit waits for the delay period representing the longest time period required by any power supply to ensure that power supply is ready to turn on.

3. The system of claim 1 wherein the comparator compares the bus voltage signal to the reference voltage signal representing a threshold voltage sufficient to ensure that another power supply has turned on.

4. A power supply for supplying power to an electronic system via a system voltage bus, the power supply providing coordinated turn on of paralleled power supplies supplying power to the electronic system via the system voltage bus and comprising:

an internal detection circuit detecting whether an input voltage is sufficient to turn on and providing a startup conditions met signal indicating whether the input voltage is sufficient to turn on the power supply, a delay circuit receiving the startup conditions met signal from the internal detection circuit and, when the startup conditions met signal indicates the input voltage is sufficient, waiting for a delay period and then providing a start independently signal indicating that the power supply can start independently, a comparator receiving a bus voltage signal from the system voltage bus, comparing the bus voltage signal to a reference voltage signal, and providing, when the bus voltage signal exceeds the reference voltage signal, an other supply on signal indicating another power supply has turned on, an OR circuit receiving the start independently signal from the delay circuit, receiving the other supply on signal from the comparator, and providing, when either the start independently signal indicates the power supply can start independently or the other supply on signal indicates another power supply has turned on, an initiate turn on signal indicating the power supply can turn on, and a power supply control circuit receiving the initiate turn on signal from the OR circuit and causing power supply to supply power to the electronic system via the system voltage bus when the initiate turn on signal indicates the power supply can turn on.

5. The power supply of claim 4, wherein the delay circuit waits for the delay period representing the longest time period required by any power supply to ensure that power supply is ready to turn on.

6. The power supply of claim 4, wherein the comparator compares the bus voltage signal to the reference voltage signal representing a threshold voltage sufficient to ensure that another power supply has turned on.

7. A method for providing coordinated turn on of paralleled power supplies, the method performed by one of the paralleled power supplies and comprising the steps of:

(a) detecting whether an input voltage is sufficient to turn on;

(b) waiting for a delay period and then indicating that the power supply can start independently;

(c) comparing a bus voltage to a reference voltage and indicating another power supply has turned on when the bus voltage exceeds the reference voltage; and (d) supplying power to an computer system when either step (b) indicates the power supply can start independently or step (c) indicates another power supply has turned on.

8. The method of claim 7 wherein step (b) comprises waiting for the delay period representing the longest time period required by any power supply to ensure that power supply is ready to turn on.

9. The method of claim 7 wherein step (c) comprises comparing the bus voltage to a reference voltage representing a threshold voltage sufficient to ensure that another power supply has turned on.

10. The method of claim 9 wherein step (b) comprises waiting for the delay period representing the longest time period required by any power supply to ensure that power supply is ready to turn on.

11. A system for providing coordinated turn on of paralleled power supplies supplying power via a system voltage bus, comprising:

An electronic system; and a plurality of power supplies, each power supply detecting a voltage on the system voltage bus and supplying power to the computer system upon determining that the bus voltage detected indicates that another power supply has turned on.

12. The system of claim 11 wherein each power supply determines that another power supply has turned on by comparing the bus voltage detected on the system voltage bus to a threshold voltage.

13. The system of claim 11 wherein each power supply determines whether an input voltage is sufficient to turn on and supplies power to the electronic system upon either determining that the input voltage is sufficient to turn on or determining that another power supply has turned on.

14. The system of claim 13 wherein each power supply waits for a delay period upon determining the input voltage is sufficient to turn on and supplies power to the computer system upon either determining that the delay period is sufficient to turn on and waiting for the delay period or determining that another power supply has turned on.

15. The system of claim 14 wherein the delay period represents the longest time period required by any power supply to ensure that power supply is ready to turn on.

16. A method for providing coordinated turn on of paralleled power supplies supplying power via a system voltage bus, the method performed by one of the paralleled power supplies and comprising the steps of:

(a) detecting a bus voltage on the system voltage bus; and (b) supplying power to an electronic system upon determining that the bus voltage detected indicates that another power supply has turned on.

17. The method of claim 16 wherein step (b) comprises comparing the bus voltage detected to a threshold voltage sufficient to ensure that another power supply has turned on.

18. The method of claim 16, further comprising the step (c) of determining whether an input voltage is sufficient to turn on, and wherein step (b) comprises supplying power to the electronic system upon either determining that the input voltage is sufficient to turn on in step (c) or detecting a bus voltage on the system voltage bus in step (a).

19. The method of claim 18 wherein step (c) further comprises waiting for a delay period upon determining the input voltage is sufficient to turn on, and wherein step (b) comprises supplying power to the electronic system upon either determining that the delay period is sufficient to turn on and waiting for the delay period in step (c) or detecting a bus voltage on the system voltage bus in step (a).

20. The method of claim 19 wherein the delay period of step (c) represents the longest time period required by any power supply to ensure that power supply is ready to turn on.

* * * * *